United States Patent
Cormier et al.

(10) Patent No.: US 9,967,851 B2
(45) Date of Patent: May 8, 2018

(54) METHOD AND SYSTEM FOR UTILIZING A MULTI-IDENTITY UICC

(71) Applicant: BlackBerry Limited, Waterloo (CA)

(72) Inventors: Jean-Philippe Cormier, Ottawa (CA); Maiyuran Wijayanathan, Waterloo (CA); Joseph Tu Long Deu-Ngoc, Maryhill (CA); Trevor Plestid, Ottawa (CA)

(73) Assignee: BlackBerry Limited, Waterloo (CA)

( * ) Notice: Subject to any disclaimer, the term of this patent is extended or adjusted under 35 U.S.C. 154(b) by 0 days. days.

(21) Appl. No.: 14/262,672

(22) Filed: Apr. 25, 2014

(65) Prior Publication Data
US 2015/0312873 A1   Oct. 29, 2015

(51) Int. Cl.
*H04W 88/06* (2009.01)
*H04W 8/18* (2009.01)
*H04B 1/3816* (2015.01)
*H04W 60/00* (2009.01)

(52) U.S. Cl.
CPC ........ *H04W 60/005* (2013.01); *H04B 1/3816* (2013.01); *H04W 8/18* (2013.01); *H04W 8/183* (2013.01); *H04W 88/06* (2013.01)

(58) Field of Classification Search
CPC ..... H04W 60/005; H04W 8/18; H04W 88/06; H04W 8/183; H04B 1/3816
See application file for complete search history.

(56) References Cited

U.S. PATENT DOCUMENTS

| 8,606,232 B2 | 12/2013 | Siu et al. |
| 8,639,245 B2 | 1/2014 | Shi et al. |
| 2005/0164737 A1* | 7/2005 | Brown ................. H04W 8/245 455/558 |
| 2008/0020755 A1 | 1/2008 | Liu et al. |
| 2010/0304670 A1* | 12/2010 | Shuo .................. H04M 1/7253 455/41.1 |
| 2011/0294472 A1 | 12/2011 | Bramwell et al. |
| 2012/0052865 A1* | 3/2012 | Shuai ................ H04W 36/0022 455/440 |
| 2012/0282924 A1* | 11/2012 | Tagg ....................... H04W 8/04 455/432.1 |
| 2013/0065557 A1* | 3/2013 | Zhang et al. ................. 455/411 |

(Continued)

FOREIGN PATENT DOCUMENTS

EP 2410777 A1 1/2012
EP 2530960 A1 * 12/2012 ............ H04W 8/205

(Continued)

OTHER PUBLICATIONS

MV-370/MV-372 VoIP GSM Gateway User Manual, PORTech Communications Inc. accessed Feb. 10, 2014.

(Continued)

*Primary Examiner* — Kamran Afshar
*Assistant Examiner* — Minjung Kim
(74) *Attorney, Agent, or Firm* — Moffat & Co.

(57) ABSTRACT

A method at a user equipment including a mobile equipment and a smartcard, the method receiving from a remote server a plurality of subscriber identities and a roaming policy; storing the plurality of subscriber identities and roaming policy on the smartcard; selecting, based on the roaming policy, a subscriber identity; and attaching to a network based on the selected subscriber identity.

19 Claims, 9 Drawing Sheets

(56) References Cited

U.S. PATENT DOCUMENTS

| | | |
|---|---|---|
| 2013/0183932 A1 | 7/2013 | Lemilainen et al. |
| 2013/0281085 A1 | 10/2013 | Sen |
| 2013/0310035 A1 | 11/2013 | Gouriou et al. |
| 2013/0331096 A1 | 12/2013 | Rogan |
| 2014/0099916 A1 | 10/2014 | Mallikarjunan |

FOREIGN PATENT DOCUMENTS

| | | |
|---|---|---|
| WO | 2011159549 A9 | 12/2011 |
| WO | 2013040250 A1 | 3/2013 |
| WO | 2013097177 A1 | 7/2013 |

OTHER PUBLICATIONS

Product Information: SMB32, GSM SIM Bank, http://www.linksz.net/SMB32.htm, accessed Feb. 10, 2014.

Product Information: SBK-128, Remote SIM Bank, http://www.portech.com.tw/p3-product1_1.asp?Pid=65, accessed Feb. 10, 2014.

Setup MV-370 GSM Gateway with Asterisk, http://www.voip-info.org/wiki/view/Setup+MV-370+GSM+Gateway+with+Asterisk, accessed Feb. 10, 2014.

Product Information: SIM Server, www.pulsewan.com, accessed Feb. 10, 2014.

FAQs page, AT&T Cell Phones: What Does Remote SIM Mode Do on My SGH-A827 (Access)?, http://originus.samsung.com/us/support/faq/FAQ00022661/22829/SG, accessed Feb. 10, 2014.

3GPP TS 31.102, "Characteristics of the Universal Subscriber Identity Module (USIM) application," (Release 12), V.12.3.0, Mar. 2014.

European Patent Office, Extended European Search Report on Application No. 15164049.7, dated Sep. 22, 2015.

European Patent Office, Office Action for Application No. 15164049.7, dated Jul. 11, 2017.

European Patent Office, Office Action for Application No. 15164049.7, dated Jan. 23, 2018.

\* cited by examiner

METHOD AND SYSTEM FOR UTILIZING A MULTI-IDENTITY UICC

FIELD OF THE DISCLOSURE

The present disclosure relates a method and system for utilizing a multi-identity UICC, and in particular relates to a user equipment (UE) having multiple subscriber identities for use when roaming or on a home network.

BACKGROUND

The use of user equipment, including smartphones, cellular phones, laptops, digital pagers, mobile devices, among others, is becoming more prevalent. Many of these mobile devices have at least one cellular connection which may be used for both circuit switched and packet switched calls. Such cellular connection is usually based on a subscription or prepaid plan with a cellular provider.

In order to access the cellular provider's network, a smart card, such as a universal integrated circuit card (UICC), is typically found on such devices, where the UICC has one or more applications used for subscriber identity verification. Such applications may, for example, include a subscriber identity module (SIM) application for the global system for mobile communications (GSM) networks, a universal subscriber identity module (USIM) application for a universal mobile telecommunications system (UMTS system), a code division multiple access (CDMA) subscriber identity module application (CSIM application) for a CDMA 2000 network, a remote-user identity module (RUIM) for a CDMA network, Internet Protocol (IP) Multimedia Subsystem (IMS) Services Identity Module (ISIM) for IMS service, among others. Once authenticated to the network, the user equipment may then exchange voice or data, depending on the subscription with the cellular network.

Outside of the subscriber's home cellular network, the UE roams on to a visitor network. Authentication still occurs with the home network and agreements between the visitor network and the home network allow for the billing of the customer. Typically such billing is relatively expensive compared to the services acquired from the home cellular network.

BRIEF DESCRIPTION OF THE DRAWINGS

The present disclosure will be better understood with reference to the drawings, in which.

DETAILED DESCRIPTION OF THE DRAWINGS

The present disclosure provides a method at a user equipment comprising a mobile equipment and a smartcard, the method comprising: receiving at the user equipment, from a remote server, a plurality of subscriber identities and a roaming policy; storing the plurality of subscriber identities and roaming policy on the smartcard; selecting, based on the roaming policy, a subscriber identity; and attaching to a network based on the selected subscriber identity.

The present disclosure further provides a user equipment comprising: a mobile equipment; and a smartcard, wherein the user equipment is configured to: receive from a remote server a plurality of subscriber identities and a roaming policy; store the plurality of subscriber identities and roaming policy on the smartcard; select, based on the roaming policy, a subscriber identity; and attach to a network based on the selected subscriber identity.

As used herein, a Universal Integrated Circuit Card (UICC) is a smart card that contains applications. The term UICC may be utilized in various network types, including in universal mobile telecommunications system (UMTS) and long term evolution (LTE) networks. However, the present disclosure is not meant to be limited to these technologies and in other circumstances, the UICC may be used to represent any smart card that can be inserted or embedded or implemented as software into a device.

The UICC may be inserted into a mobile equipment (ME). As used herein, a mobile equipment represents a smartphone or device that is capable of cellular network communications, but without a UICC card inserted.

A device that includes both the ME and the UICC is referred to herein as user equipment (UE). The UE may, in other embodiments, be referred to as a mobile device, laptop, data enabled device, smartphone, among other options.

A universal terrestrial radio access network (UTRAN) subscriber identity module (USIM) is an application present on a UICC which contains UTRAN configuration files read by an ME. In accordance with the present disclosure, the USIM resides on the UICC. The present disclosure is described using the USIM as the subscriber identity. However, in other embodiments the subscriber identity may be a SIM, RUIM, CSIM, ISIM, among other options.

Further, while the present disclosure is described with relation to a physical UICC, in some embodiments the UICC may be virtual, and the data and applets found on the UICC may reside in the memory of a user equipment rather than on the UICC.

The ME uses the USIM profile on the UICC to connect to a network. Such connection involves reading data from the UICC and performing authentication with the network. A typical process for authentication in a Third Generation network is provided with regard to FIG. 1.

Figure 1:
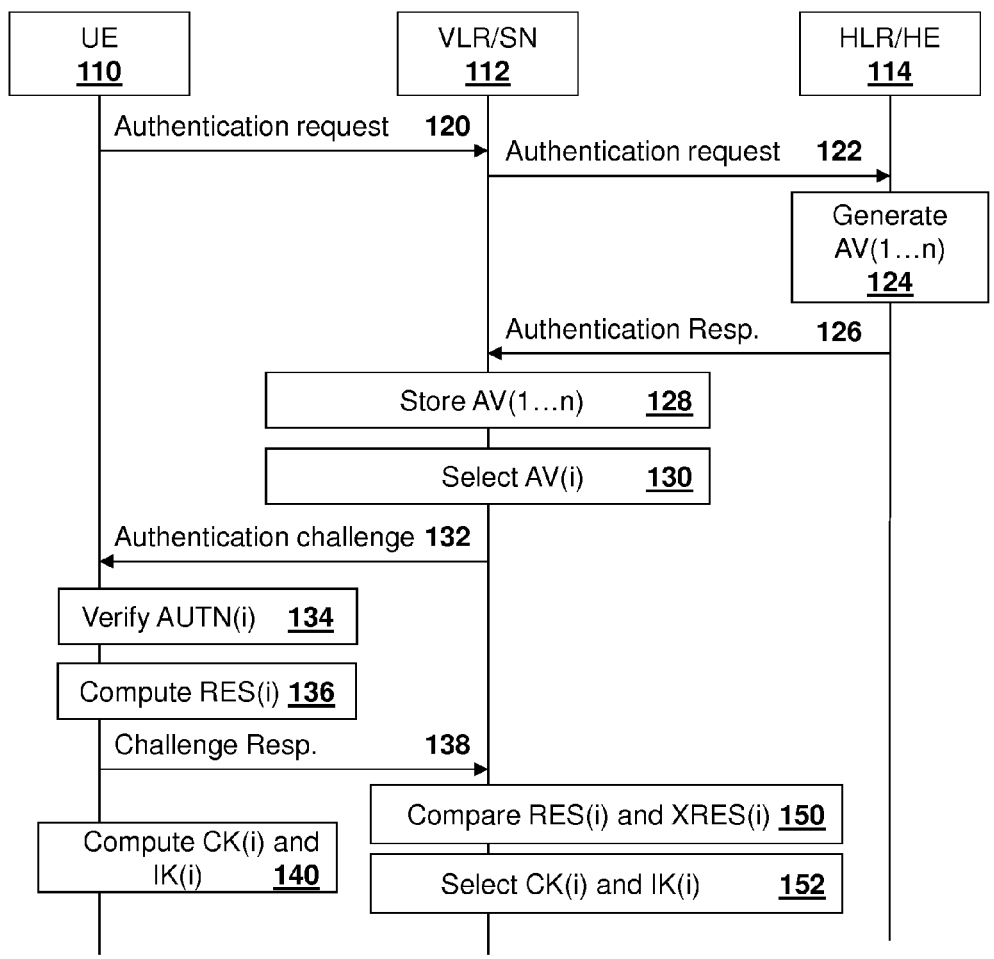
FIG. 1 is a flow diagram showing authentication of a UE roaming in a non-home network.

Reference is now made to FIG. 1, which shows a user equipment 110 communicating with a Visitor Location Registry (VLR) or Serving Network (SN) 112. VLR/SN 112 further communicates with the Home Location Registry (HLR) or Home Entity (HE) 114.

When user equipment 110 enters the serving node, the user equipment 110 needs to be authenticated. In this case, the user equipment may send an authentication request 120 to VLR/SN 112, which may include an identifier such as the international mobile subscriber identity (IMSI) found in the identity module on the UE 110. Such IMSI is found in the USIM on the UICC.

VLR/SN 112 receives the authentication request and forwards the authentication request, including the IMSI, to the HLR/HE 114, as shown by reference numeral 122.

The HLR/HE 114 receives the authentication request and, at block 124, generates a plurality of authentication vectors (AV), shown as AV(1 . . . n). An authentication vector includes a plurality of components. These include a random number (RAND), an expected response (XRES), a cipher key (CK), an integrity key (IK) and an authentication token (AUTN).

The authentication vectors are then sent back to the VLR/SN 112 in message 126, and at block 128, the VLR/SN 112 stores the authentication vectors. Messages 120, 122, 126, along with blocks 124 and 128 provide for a first phase of the authentication protocol, namely the distribution of the authentication vectors from the home network to the VLR/SN 112.

A second phase of the authentication protocol is the authentication and key agreement procedures between the user equipment 110 and the VLR/SN 112. In particular, the VLR/SN 112 selects a random number and an authentication token from the authentication vectors, as shown by block 130. VLN/SN 112 and then provides a user authentication challenge 132 to user equipment 110.

The user equipment 110 receives the authentication challenge and, as shown by block 134, verifies the authentication token, typically at the USIM on the UICC of the user equipment 110. Such authentication occurs in third generation networks. In second generation networks no such authentication token is provided.

The UICC on UE 110 then computes a response based on the random number key provided, as shown at block 136. The response is provided back to the VLR/SN 112 in message 128. The user equipment 110 further computes a cipher key and an integrity key, as shown by block 140.

VLR/SN 112, upon receiving the authentication response at message 138 compares the response with the expected response from the authentication vector, as shown by block 150. If the response and the expected response match then the VLR/SN 112 selects the cipher key and integrity key at block 152, where the selected cipher key and integrity key match with those computed at block 140 on the user equipment 110.

The above therefore shows the attachment and authentication of a third generation device such as a UMTS device that is roaming to a visiting service network.

For second generation networks such as GSM, mutual authentication does not occur but similar procedures occur where the authentication request includes a number which is used at the UE 110 to compute a response which is then provided back to the VLR/SN 112 and compared with an expected response.

The user equipment is then capable of operating on the visiting network. However, such operation may be prohibitively expensive. In particular, the roaming charges for voice and data services are particularly high when compared with the charges on the home network.

One option for users roaming into networks is the substitution of the smartcard, such as a UICC, on the user equipment with a smartcard having an identity operable on a local network. However, such substitution has its disadvantages. In particular, the user must purchase a new smartcard and insert it into the user equipment. This may involve finding a provider for the local network, communicating with the provider, establishing terms of service and inserting the card into the user equipment. Such requirements may be cumbersome, especially when frequent travel or frequent roaming occurs.

In order to overcome the above, and in accordance with one embodiment of the present disclosure, a second, local identity could be obtained from a remote server, referred to herein as a roaming identity management server (RIMS). The RIMS server manages the allocation and revocation of identities of the subscriber.

The second identity (eg USIM) could them be stored on the UICC for use when the user equipment is roaming in the local network of the second identity. The second identity may then allow for the device to act as if it was on a home network when in the remote location.

Figure 2:
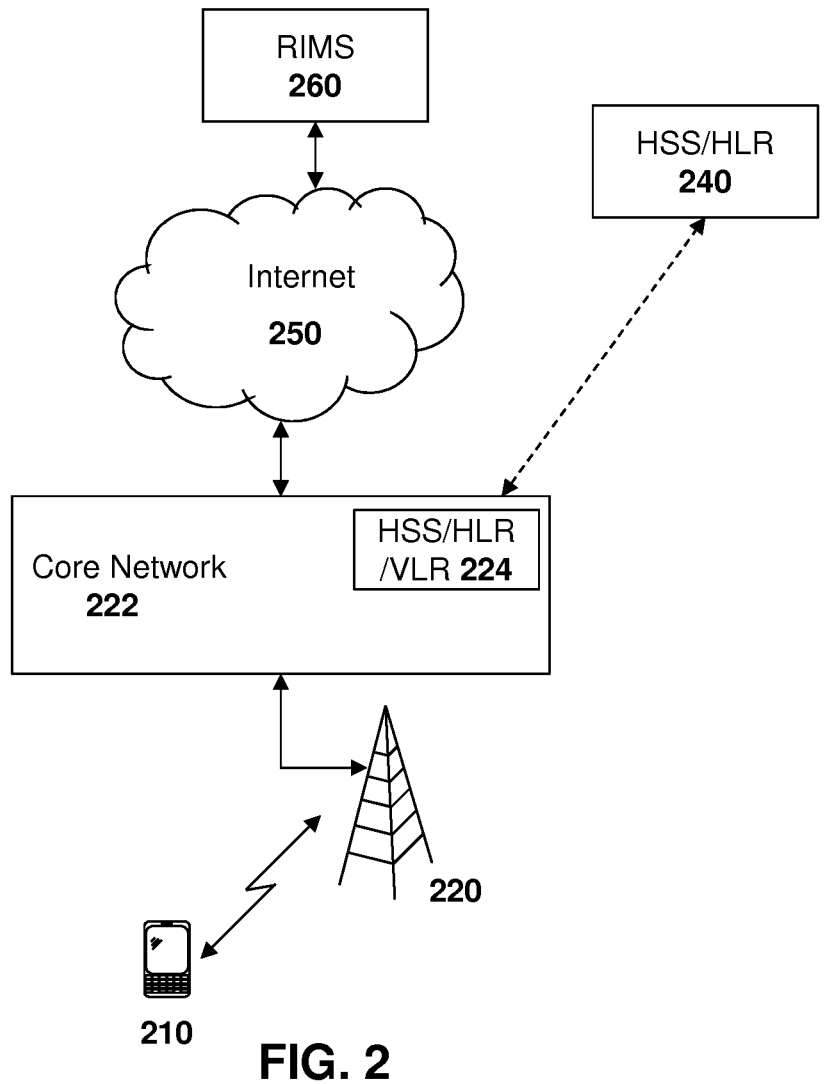
FIG. 2 is a simplified block diagram showing architecture for one embodiment of the present disclosure.

Reference is now made to FIG. 2, which shows a simplified network diagram in accordance with the present disclosure. In FIG. 2, user equipment 210 communicates with a network, comprising, in the simplified embodiment of FIG. 2, radio access network 220 (including but not limited to a base station, node B or evolved Node B), and a core network 222, which includes the home or visitor location registry 224, depending on whether radio access network is a home or visited network.

If radio access network 220 is a visited network, the UE 210 may attempt to connect and authenticate to the visited network. This is done by sending an identity, such as the UE's home network IMSI, through the VLR 224, which then communicates with the HSS/HLR 240 over a network using an interface such as a GLa interface, and obtains the authentication vectors as described above with regard to FIG. 1. A challenge and response is then used to authenticate UE 210.

Otherwise, if network 220 is a home network, authentication and attaching is accomplished using HSS/HLR 224.

The present disclosure provides for the use of two or more subscriber identities on a UICC that may be chosen for connection to a local network. The identities (e.g. USIMs) may be received from RIMS 260 over Internet 250.

In one example, a UE may obtain a local identity when roaming over the roaming cellular connection. Thus, if a UE is turned on at an airport in a foreign country, for example, the UE may automatically, or through user input, send a request to RIMS 260 for a local USIM. This request may include information such as the mobile country code (MCC), mobile network code (MNC), location area code/tracking area code (LAC/TAC), and/or a cellular identifier, among other information. In this case the RIMS 260 may provide a local USIM for storage on the UICC by downloading the USIM application to the UICC over the air.

Once the UE has a local USIM, the USIM may then be used to access the local network, thereby avoiding roaming charges.

However, the act of obtaining the local USIM may itself incur roaming charges if the UE is using a home USIM in a visited network. To avoid such roaming changes, in some embodiments RIMS 260 may pre-provision one or more roaming USIMs on the UICC of the user equipment. For example, the user may connect to RIMS while still on the home network, or when connected to the Internet 250 through alternative communication means such as WiFi, Bluetooth, USB connection, etc. RIMS 260 may then provide a USIM for each of the countries/locations that the user will roam to.

For example, the user may, through an interactive application or interface, choose the roaming USIMs needed. In other embodiments, the UICC may be pre-provisioned with USIMs for all countries or a subset of countries (e.g. all of Europe, etc.). In another embodiment, RIMS 260 may push new provisioning to the user equipment based on changes in the provisioning. In another embodiment the IT Administrator of the user using a device management system could push the new USIMs for the planned travel.

With the presence of multiple USIMs on a UICC, the present disclosure further provides intelligence on the UICC to switch the mobile identity to a non-roaming or more preferable identity on an as-needed basis. In particular, a roaming applet may choose a USIM based on a roaming policy, as described below.

RIMS 260 may be part of the radio access network 220 if the service is provided by the home carrier of UE 210. Alternatively, RIMS 260 may be independent of the home carrier.

In addition to provisioning USIMs, RIMS 260 may further be used to revoke USIMs. In particular, the RIMS 260 may communicate with the UE to explicitly revoke one or more identities. Such revocation may be based on subscriptions or contracts between RIMS 260 and the user of the UE.

Alternatively, the USIM, when being provisioned, may have a duration of validity. A timer or time-out mechanism could then be used to clear expired USIMs from the UICC. This enforcement would be implemented on the UICC possibly as an applet.

Once the USIM is revoked, RIMS could provision the USIM to another device in some embodiments.

Based on the above, RIMS 260 may be responsible for all negotiations, activations, and communications with a remote network for obtaining a USIM, removing the burden from a user of the UE.

RIMS 260 may further, in some embodiments, provide other services such as linking phone numbers (possibly using call forwarding) of local networks to the currently active profile phone number.

Thus, in accordance with the present disclosure, in order to reduce roaming costs of a subscriber, a subscriber's UICC contains multiple identities (USIMs). Such identities may have all information needed to attach to a network, including but not limited to the international mobile subscriber identity (IMSI), authentication parameters, among other information.

Figure 3:
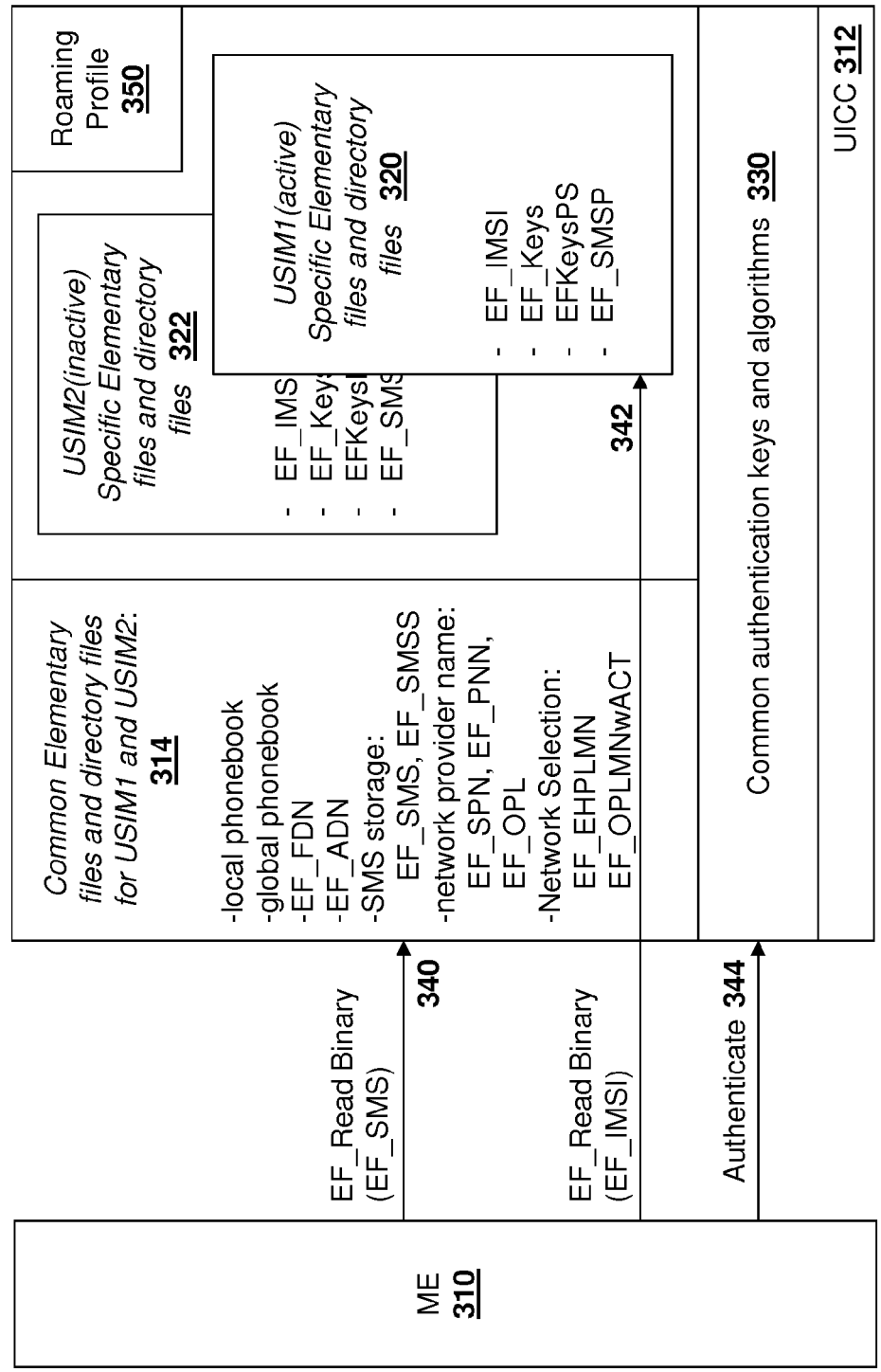
FIG. 3 is a block diagram of logical blocks within a UICC in accordance with one embodiment of the present disclosure.

Reference is now made to FIG. 3, which shows one configuration for a multi-profile UICC. In particular, ME 310 communicates with a UICC 312. For example, UICC 312 may be inserted into a card slot as is common in the art. However, in other embodiments, UICC 312 may be a virtual UICC (soft SIM) and may actually reside in the memory of ME 310.

UICC 312 may store various information in elementary files, and examples of such information may include any of the elementary files defined in the Third Generation Partnership Project (3GPP) Technical Specification (TS) 31.102, "*Characteristics of the Universal Subscriber Identity Module (USIM)*", v. 12.3.0, March 2014, and in 3GPP TS 31.103, "*Characteristics of the IP Multimedia Services Identity Module (ISIM)*", v. 12.1.0, March 2014, the entire contents of both of which are incorporated herein by reference.

However, in the embodiment of FIG. 3, the UICC 312 has an architecture that includes a common file area 314 and USIM areas 320 and 322. Common elementary files and directory files for all profiles on the UICC are stored in a common file area 314. Common file area 314 includes various elementary files (EF) which contain data items. For example, common file area 314 may include a local phone book and a global phone book, therefore ensuring that whenever ME 310 switches identities, the phone book remains the same regardless of the identity.

In one embodiment, the common file area 314 may further include the fixed dialing numbers (FDN) in the EF_FDNs storage space.

Other elements that may be stored within the common file area 314 may include the EF_ADN (abbreviated dialing numbers), and SMS storage which may include elementary files for short message service (EF_SMS), and short message service status (EF_SMSS).

Common file area 314 may further include various network provider names, including elementary files for the service provider name (EF_SPN) which is used to display a name at ME 310. The network provider name may further include elementary files for the public land mobile network (PLMN) network name (EF_PNN). The network provider name may further include elementary files for the operator PLMN list (EF_OPL), which is a prioritized list of location area information identities. In other embodiments these files could be part of the specific elementary files and directory files.

The common file space 314 may further include network selection information including elementary files for the equivalent home PLMN (EF_EHPLMN) and the operator controlled PLMN selector with access technology (EF_OPLMNwACT). In other embodiments these files could be part of the specific elementary files and directory files.

Such common elementary files may be common for both identities shown in the embodiment of FIG. 3.

The above list of information stored in the common elementary file space is exemplary, and is not meant to be limiting.

The example of FIG. 3 includes two USIM identities, namely USIM 320 and USIM 322. USIM 320 may be the default home subscriber identity and may include various information for that home identity, including the IMSI, ciphering keys and integrity keys, stored in EF_KEYS; packet switched domain ciphering and integrity keys, stored in EF_KEYSPS as well as the short message service parameters stored in EF_SMSP. In another embodiment the USIM could also contain expiry and revocation information necessary to enforce rules of when this identity can be used during roaming and when this identity needs to be removed/disabled in the UICC. Other information may also be included for the USIM 320 profile and the present disclosure is not limited by any particular parameters stored in USIM 320.

USIM 322 continues similar information.

In the embodiment of FIG. 3, USIM 320 and USIM 322, include common authentication keys and algorithms, which are shown in block 330.

In operation, if ME 310 needs information common to all USIMs, ME 310 queries the UICC 312, which directs the query to the common file space 314. For example, if ME 310 needs information for SMS, an EF_READ BINARY (EF_SMS) query, shown by arrow 340, may be made to UICC 312, which then directs the query to the common elementary files in common file area 314.

Similarly, if ME 310 needs information from the currently active USIM, a query may be made to the UICC 312, which then directs the query to the active USIM. In the example of FIG. 3, an EF_READ BINARY (EF_IMSI) query 342 is made to UICC 312, which directs the query to USIM 320.

ME 310 may also request authentication by a query 344. In the example of FIG. 3, a common authentication keys and algorithms block 330 may provide authentication, and UICC 312 directs the authentication query to this block.

Thus, UICC 312 acts as a router to route queries to the proper block. In order to achieve this, the UICC's routing function should understand the capabilities and the contents of each block. This can be done by querying the block to list its contents or by the block registering its contents with the UICC's routing function.

UICC 312 may further include a roaming profile block 350, which is used to determined what identity to use in a particular location.

In an alternative embodiment, instead of common authentication keys and algorithms, each network operator may have its own authentication keys and algorithms and, in this case, each USIM may further have an authentication key and algorithm associated with it.

Figure 4:
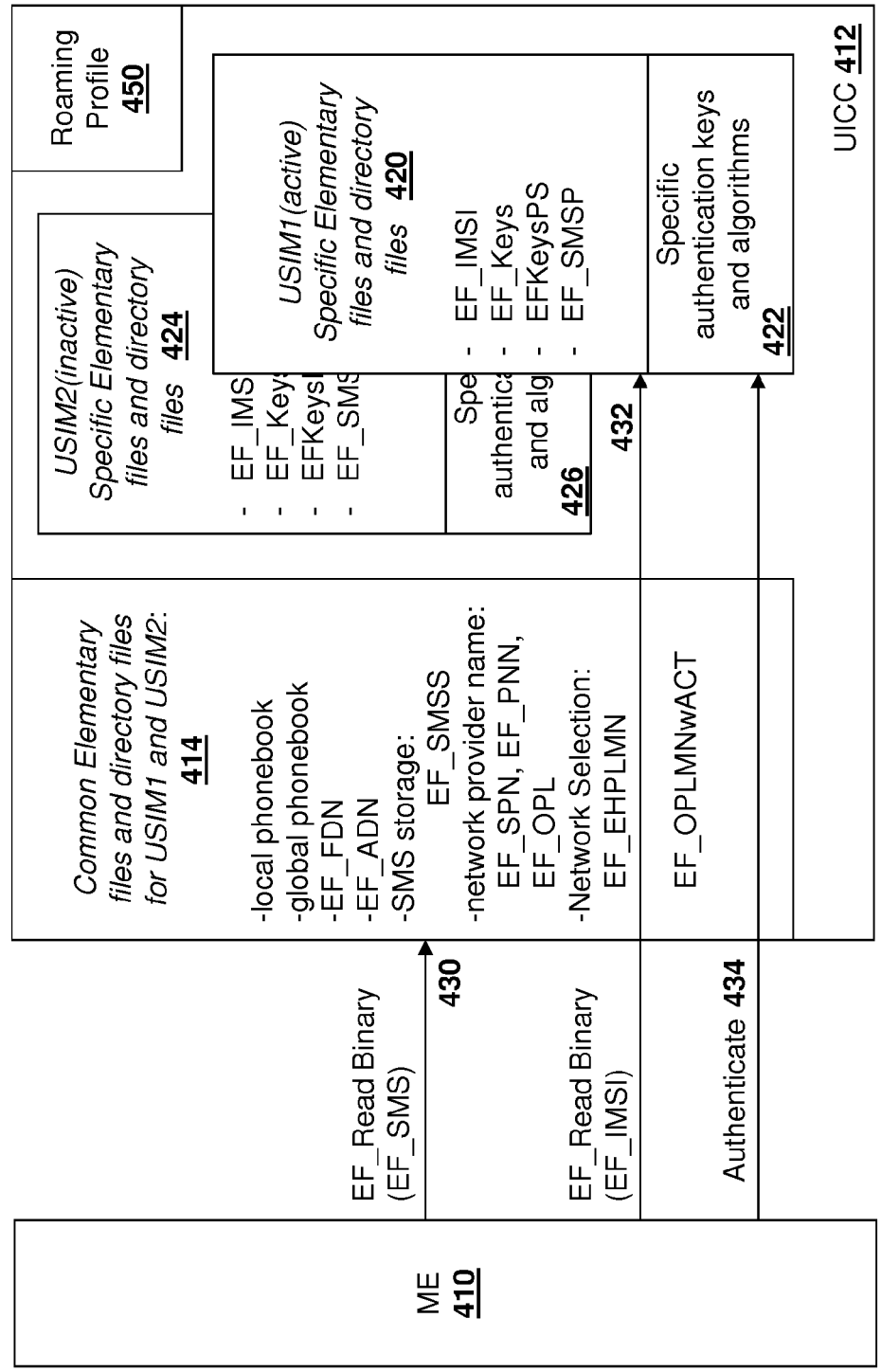
FIG. 4 is a block diagram of logical blocks within a UICC in accordance with an alternative embodiment of the present disclosure.

Reference is now made to FIG. 4, which shows an alternative UICC configuration to the configuration of FIG. 3. In particular, as seen in FIG. 4, ME 410 communicates with a UICC 412 that has a common elementary file space 414 used to store common information for the various profiles on UICC 412. Such profiles in the example of FIG. 4 include USIM 420 and USIM 424.

The information stored in the common file space 414, USIM 420 and USIM 424 is similar to that stored in the common file space 314, USIM 320 and USIM 322 in FIG. 3.

However, in the embodiment of FIG. 4, the specific authentication keys and algorithms are associated with a USIM. Thus, authentication keys and algorithms for USIM 420 are shown by block 422.

Similarly, if USIM 424 was active then the authentication would occur with the authentication keys and algorithms block 426.

As with the embodiment of FIG. 3, if the ME 410 needs information from UICC 412, ME 410 may query the UICC and the UICC can direct the query to the proper element. For example, an EF_READ BINARY (EF_SMS) query 430 may be directed to the common file space 414.

Similarly, an EF_READ BINARY (EF_IMSI) query 432 may be directed to the active USIM, in this case USIM 420.

An authentication query 434 is directed to the active USIM authentication keys and algorithms box, in this case block 422.

Further, a roaming profile 450 exists in UICC 412 and is used to determine and enforce what identity to use in a particular location.

FIGS. 3 and 4 therefore show an embodiment in which a UICC includes a plurality of profiles which may be utilized to connect to a network. Such profiles may, for example, be used to reduce or eliminate roaming fees when in a non-home location.

The embodiments of FIGS. 3 and 4 show only two profiles on the UICC. This is however not meant to be limiting, and the present disclosure could include as many profiles as the memory limits on a UICC can hold. Thus, for example, the UICC may come preloaded with local networks in the entire world in one embodiment.

In one embodiment, the selection of the USIM to use to connect to a network may be done automatically at the device. In particular, reference is now made to FIG. 5.

Figure 5:
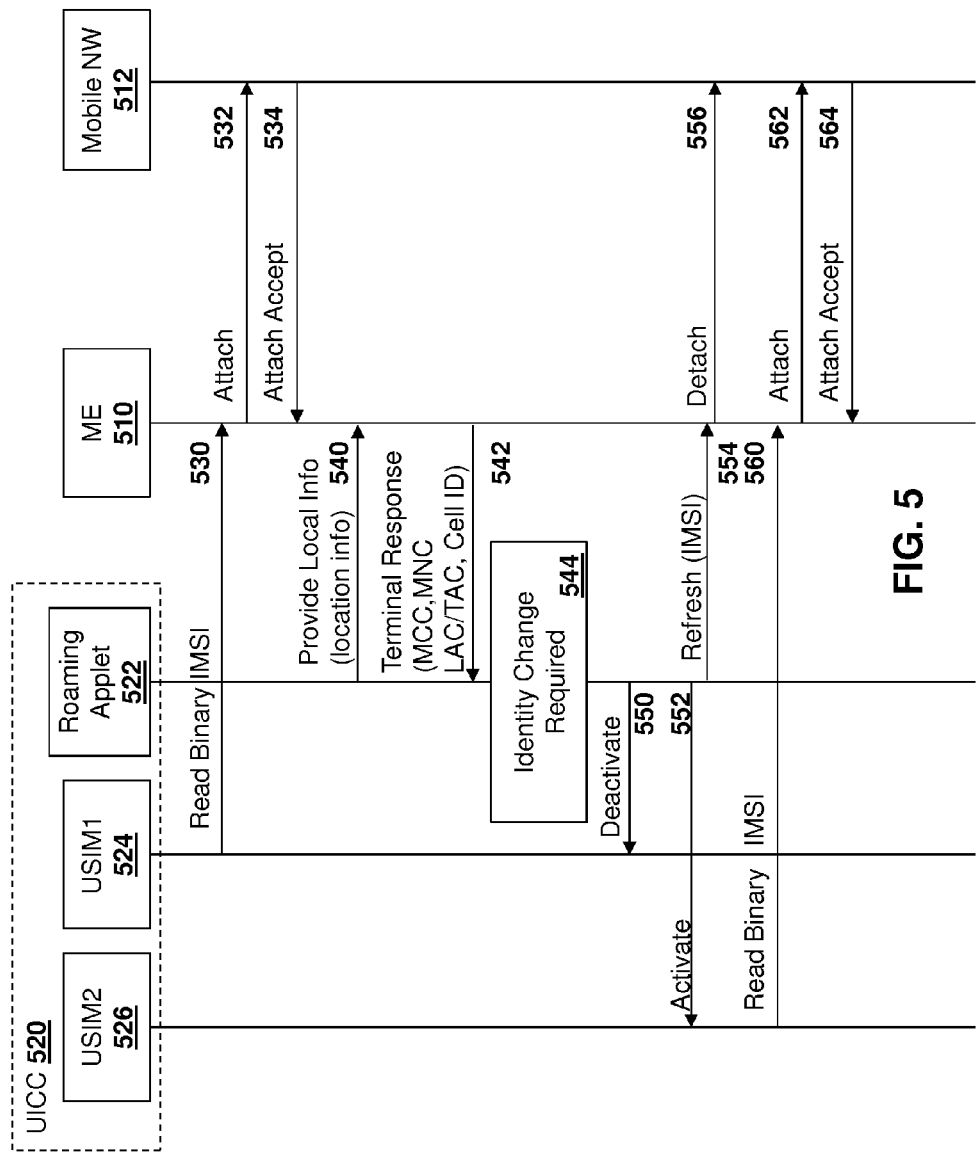
FIG. 5 is a flow diagram showing the selection of a subscriber identity in accordance with one embodiment of the present disclosure.

As seen in FIG. 5, an ME 510 is in communication with a mobile network 512. ME 510 is further associated with a UICC 520 which has various elements. In the embodiment of FIG. 5, the UICC 520 includes a USIM 524 and a USIM 526, as well as a roaming applet 522 which may provide for the selection of the USIM to utilize in a particular network.

In the example of FIG. 5, the process starts with the first, home USIM 524 providing the IMSI to ME 510, as shown by arrow 530. Using the received IMSI, the ME 510 sends an attach request 532 to mobile network 512.

Assuming attachment is successful, mobile network 512 then returns an attach accept message 534 to ME 510.

If mobile network 512 is not the home network, ME 510 may be considered to be roaming. Roaming charges may be incurred by utilizing the IMSI of USIM 524 in mobile network 512.

In this case, once the attach accept message 534 has been received by ME 510, roaming applet 522 may then use a roaming policy to determine whether a change of identity is needed. Applet 522 may do this in various ways. For example, roaming applet 522 may use the location of the device along with a roaming policy in one embodiment. In other embodiments, roaming applet 522 may use other information, such as knowledge of travel from a calendar or travel application on the user equipment that has been communicated to the applet 522. In this case, a time determination may be made to see whether the device should be in a location and identity can be based on the time and the roaming policy. In another embodiment, the roaming policy itself can trigger the necessary identity change based on time. The roaming policy would include a schedule for enabling or disabling certain identities.

If using location, the roaming applet 522 may try to determine the location of the device. In one embodiment the location may be determined by roaming applet 522 sending a request to ME 510 to provide location information, as shown by arrow 540. The request may be in the form of a PROVIDE LOCAL INFORMATION message as defined in 3GPP TS 31.111, *"Universal Subscriber Identity Module (USIM), Application Toolkit (USAT)"*, v. 12.3.0, March 2014, the contents of which are incorporated herein by reference. Alternative, the message at arrow 540 may be a location status event as defined in the 3GPP TS 31.111 specification.

ME 510 may provide a terminal response 542 to the roaming applet 522. The terminal response may be based on request 540 in one embodiment, or may be automatically provided to the roaming applet 522 upon the ME receiving attach accept message 534. Alternatively, message 542 may be an Envelope Download command providing the location status. If the response 542 is sent based on the attach accept message 534, request 540 may be omitted from the embodiment of FIG. 5.

Terminal response 542 may include various information, including any or all of the mobile country code (MCC), the mobile network code (MNC), the location area code/tracking area code (LAC/TAC), as well as cellular identifier.

In the example of FIG. 5, the mobile network 512 is not the home network and the roaming applet 522 therefore determines, at block 544, that an identity change is required.

In one embodiment, applet 522 refers to a roaming profile to make its determination. For example roaming profile 350 from FIG. 3 or 450 from FIG. 4 may be referenced. An example table showing a roaming profile that utilizes the MCC and MNC in order to determine an identity of a USIM to use in a particular location is shown below with regard to Table 1. In the example of Table 1 below, the identity of the USIM is provided through the unique IMSI identifier. In another embodiment Table 1 may include expiry and revocation information necessary to enforce rules of when this identity can be used during roaming and when this identity needs to be removed/disabled in the UICC the enforcement of these rules would be done by the roaming applet.

TABLE 1

Example of a Roaming Policy

| MCC | MNC (Optional) | IMSI | Policy | Policy schedule |
|---|---|---|---|---|
| 310 | | 1234567 | Home - Never expire | Disable at date 1 and enable at date 2 |
| 302 | 720 | 7654321 | Allowed usage period: DATE1, TIME1 to DATE 2 TIME 2. Revoke DATE3 TIME3 | Enable at date 1 and disable at date 2 |
| 302 | 580 | 7654321 | Allowed usage period: DATE1, TIME1 to DATE 2 TIME 2. Revoke DATE3 TIME3 | none |
| 302 | 581 | 1234567 | Never expire | none |
| All other | All other | 1234567 | Home - Never expire | Disable at date 1 and enable at date 2 |

As seen in Table 1 above, the MCC and optionally the MNC may be used to determine an identity to use in a network. Thus, for example, if a mobile device is roaming to a mobile country code 310, then IMSI 1234567 may be used to identify the USIM for use in that location.

Further, if the MCC is 302, then the MNC may be used to further identify the particular IMSI to use.

However, the use of the MCC and MNC is optional, and other identifiers including the cellular identifier, location area code or tracking area code, wideband local area network (WLAN) access control address, satellite based coordinates, WiFi service set identifiers (SSIDs), cell identifiers, among other options could be also utilized in the roaming policy.

Further, more than one IMSI may be identified for a particular location. In this case, the Table 1 may be a prioritized list of codes which may be used to identify a particular IMSI and to attach to the network. Thus if the UE is unable to access a first priority network in the roaming list using the USIM identified, the UE may proceed to use the next highest priority USIM, or to use a default USIM if no further USIMs are identified in the priority list.

Further, if the particular MCC or MCC/MNC combination in the example of Table 1 is not present, then the applet 522 may default to a particular identity. For example, the default identity may be the home identity of the user equipment. Alternatively, the default identity may be identity last utilized to connect to a network. In other embodiments, the default entity may be a third USIM identity.

Therefore, at block 544, the applet 522 analyzes the information received through response 542, determines that an identity change is required based on the roaming policy for the currently enabled USIM, and then it determines a USIM to use based on the identifier in the roaming policy in order to connect to the network.

In one embodiment, the roaming policy may be received from the RIMS at the user equipment and stored on the UICC.

In other embodiments, instead of using an IMSI, the identifier used to identify the USIM may simply be a numeric value which points to a particular USIM. In other embodiments, other identifiers may also be used.

Next, roaming applet 522 sends a deactivate command 550 to USIM 524. Further, roaming applet 522 sends an activate command 554 to USIM 526, which is the USIM selected at block 544.

Roaming applet 522 thereafter sends a refresh IMSI with the IMSI of USIM 524 to ME 510 in message 554. As a result of receiving the refresh message, ME 510 may send a detach message 556 to the mobile network 512.

USIM 526 may then provide its own IMSI in the read binary IMSI command 560 to ME 510. ME 510 uses the IMSI received in message 560 to send and attach request 562 to mobile network 512. Mobile network 512 may then send and attach accept message 564.

Based on the above, the user equipment may utilize a USIM for the local network through the roaming applet. Specifically, when roaming applet 522 discovers that it is in a foreign jurisdiction, it can determine the an appropriate USIM based on a roaming profile and force the change of the active USIM to the one that is determined to be the most appropriate.

If three or more USIMs were present on UICC 520, then roaming applet 522 can make a determination of which the most appropriate and cause that USIM to be used to attach to mobile network 512.

Figure 6:
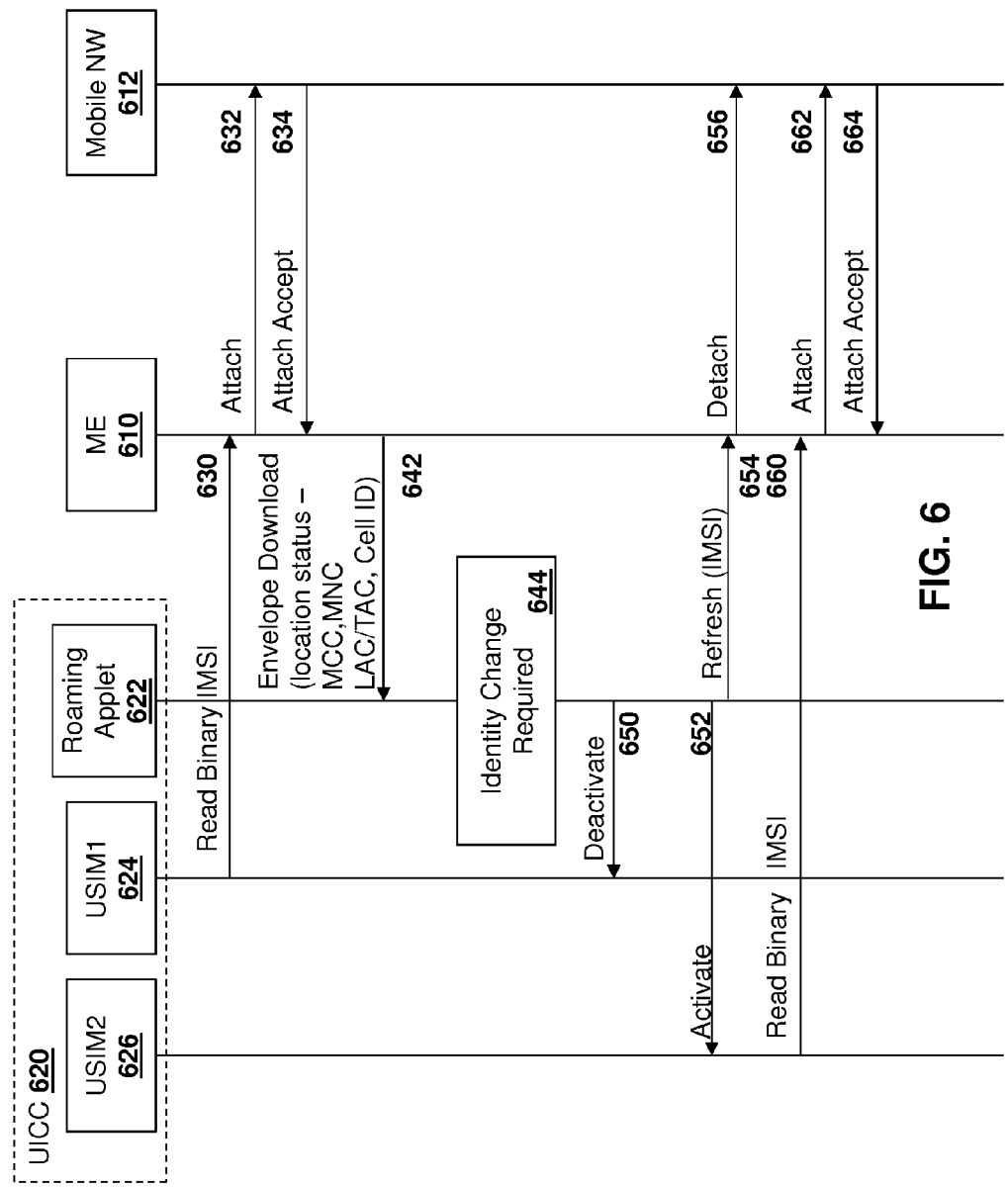
FIG. 6 is a flow diagram showing the selection of a subscriber identity in accordance with another embodiment of the present disclosure.

FIG. 6 is an alternative embodiment to that of FIG. 5, in which messages 540 and 542 have been replaced. In particular, in FIG. 6 an ME 610 is in communication with a mobile network 612. ME 610 is further associated with a UICC 620 which has various elements, including a USIM 624 and a USIM 626, as well as a roaming applet 622.

As with FIG. 5, the process of FIG. 6 starts with the first, home USIM 624 providing the IMSI to ME 610, as shown by arrow 630. Using the received IMSI, the ME 610 sends an attach request 632 to mobile network 612.

Assuming attachment is successful, mobile network 612 then returns an attach accept message 634 to ME 610.

If mobile network 612 is not the home network, ME 610 may be considered to be roaming. Roaming charges may be incurred by utilizing the IMSI of USIM 624 in mobile network 612.

In this case, once the attach accept message 634 has been received by ME 610, roaming applet 622 receives an Envelope Download command 642 providing the location status.

Envelope download command 642 may include various information, including any or all of the mobile country code (MCC), the mobile network code (MNC), the location area code/tracking area code (LAC/TAC), as well as cellular identifier.

In the example of FIG. 6, the mobile network 612 is not the home network and the roaming applet 622 therefore determines, at block 644, that an identity change is required in a similar manner to block 544 of FIG. 5.

Next, roaming applet 622 sends a deactivate command 650 to USIM 624. Further, roaming applet 622 sends an activate command 654 to USIM 626, which is the USIM selected at block 644.

Roaming applet 622 thereafter sends a refresh IMSI with the IMSI of USIM 624 to ME 610 in message 654. As a result of receiving the refresh message, ME 610 may send a detach message 656 to the mobile network 612.

USIM 626 may then provide its own IMSI in the read binary IMSI command 660 to ME 610. ME 610 uses the IMSI received in message 660 to send and attach request 662 to mobile network 612. Mobile network 612 may then send and attach accept message 664.

Figure 7:
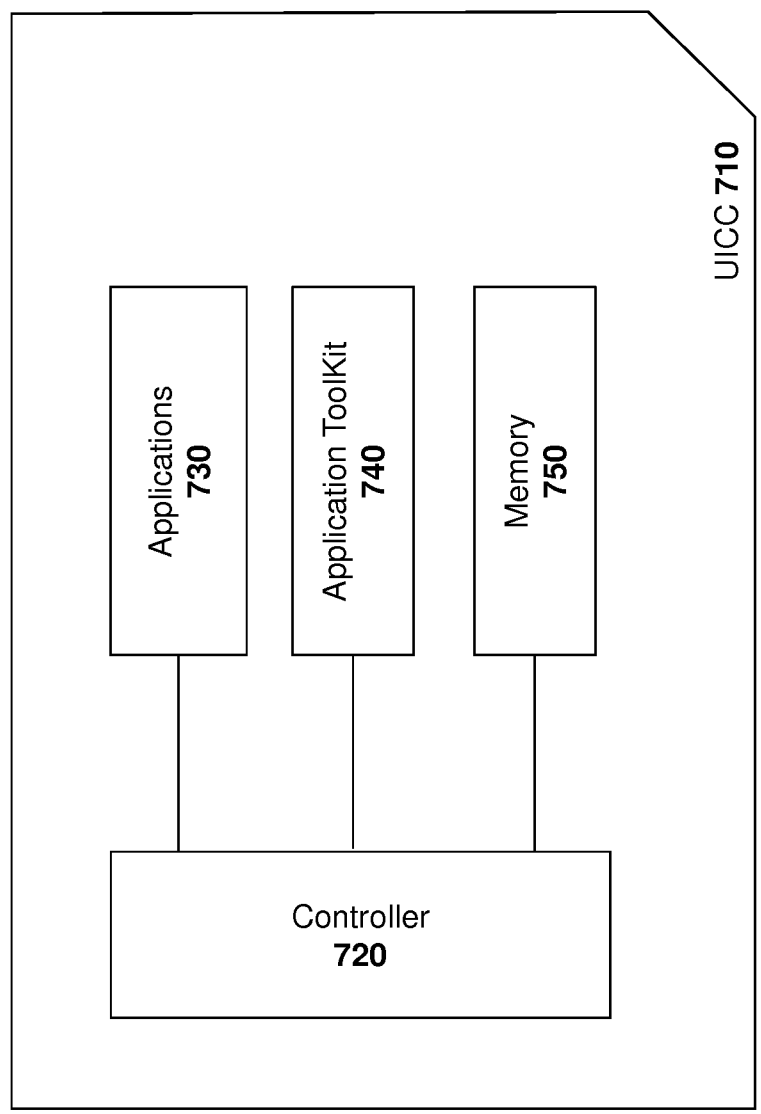
FIG. 7 is a simplified block diagram of a UICC.

A simplified diagram of a UICC is shown with regards to FIG. 7. In particular, UICC 710 includes a controller 720 which is used for processing commands and routing the commands.

Applications 730 interact with a controller and may include, for example, the USIM applications as well as the roaming applet.

Application toolkit 740 is used for processing communications to and from the UICC in accordance with current 3GPP specifications.

Memory 750 is used for storage of data, including the roaming profile from FIGS. 3 and 4 above.

In particular, any computer readable medium may be used to store data and executable program code associated with the above methods. Such data may for example include one or both of the subscriber identities and roaming policies from above, and the executable program code may include the functionality for the roaming applet if the computer readable medium is on the UICC. In other embodiments, the data and program code may be distributed among various computer readable media, such as, for example, a memory on a UICC and a memory on an ME, and may be used for the embodiments of FIGS. 3 to 6 above. In one embodiment, such computer readable medium/media may be tangible and non-transitory. Examples of such computer readable media include memory 750 on UICC 710 from FIG. 7, flash memory 824 on UE 800 from FIG. 8, or memory 940 on network element 910 from FIG. 9, among others.

Any user equipment could be used to implement the above. One example user equipment is shown below with regards to FIG. 8.

UE 800 may be a two-way wireless communication device having voice and data communication capabilities. Depending on the exact functionality provided, the UE may be referred to as a data messaging device, a two-way pager, a wireless e-mail device, a cellular telephone with data messaging capabilities, a wireless Internet appliance, a wireless device, a mobile device, or a data communication device, as examples.

Where UE 800 is enabled for two-way communication, it may incorporate a communication subsystem 811, including both a receiver 812 and a transmitter 814, as well as associated components such as one or more antenna elements 816 and 818, local oscillators (LOs) 813, and a processing module such as a digital signal processor (DSP) 820. Although not shown, communication subsystem 811 may include additional components. For example, UE 800 may comprise multiple receivers 812 and/or transmitters 814 to allow for simultaneous radio activity. In addition, as will be apparent to those skilled in the field of communications, the particular design of the communication subsystem 811 will be dependent upon the communication network in which the device is intended to operate.

Network access requirements will also vary depending upon the type of network 819. In some networks network access is associated with a subscriber or user of UE 800. A UE may require one or more smart cards such as a UICC in order to operate on a network. The smart card interface 844 is normally similar to a card-slot into which a smart card can be inserted and ejected. The smart card can have memory and hold many key configurations 851, and other information 853 such as identification, and subscriber related information.

Figure 8:
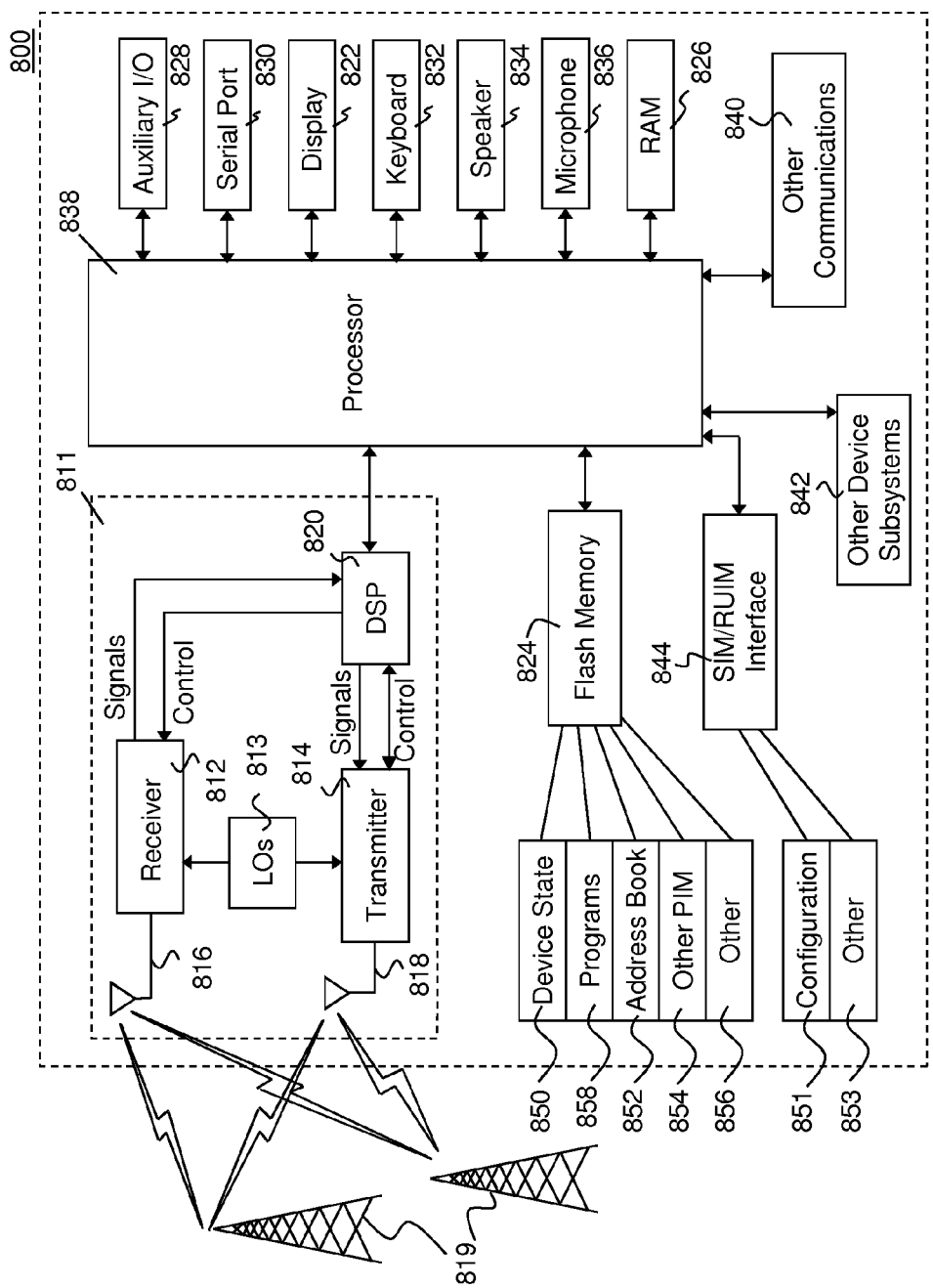
FIG. 8 is a block diagram of an example user equipment capable of being used with the present disclosure.

When required network registration or activation procedures have been completed, UE 800 may send and receive communication signals over the network 819. As illustrated in FIG. 8, network 819 can consist of multiple base stations communicating with the UE.

Signals received by antenna 816 through communication network 819 are input to receiver 812, which may perform such common receiver functions as signal amplification, frequency down conversion, filtering, channel selection and the like. A/D conversion of a received signal allows more complex communication functions such as demodulation and decoding to be performed in the DSP 820. In a similar manner, signals to be transmitted are processed, including modulation and encoding for example, by DSP 820 and input to transmitter 814 for digital to analog conversion, frequency up conversion, filtering, amplification and transmission over the communication network 819 via antenna 818. DSP 820 not only processes communication signals, but also provides for receiver and transmitter control. For example, the gains applied to communication signals in receiver 812 and transmitter 814 may be adaptively controlled through automatic gain control algorithms implemented in DSP 820.

UE 800 generally includes a processor 838 which controls the overall operation of the device. Communication functions, including data and voice communications, are performed through communication subsystem 811. Processor 838 also interacts with further device subsystems such as the display 822, flash memory 824, random access memory (RAM) 826, auxiliary input/output (I/O) subsystems 828, serial port 830, one or more keyboards or keypads 832, speaker 834, microphone 836, other communication subsystem 840 such as a short-range communications subsystem and any other device subsystems generally designated as 842. Serial port 830 could include a USB port or other port known to those in the art.

Some of the subsystems shown in FIG. 8 perform communication-related functions, whereas other subsystems may provide "resident" or on-device functions. Notably, some subsystems, such as keyboard 832 and display 822, for example, may be used for both communication-related functions, such as entering a text message for transmission over a communication network, and device-resident functions such as a calculator or task list.

Operating system software used by the processor 838 may be stored in a persistent store such as flash memory 824, which may instead be a read-only memory (ROM) or similar storage element (not shown). Those skilled in the art will appreciate that the operating system, specific device applications, or parts thereof, may be temporarily loaded into a volatile memory such as RAM 826. Received communication signals may also be stored in RAM 826.

As shown, flash memory 824 can be segregated into different areas for both computer programs 858 and program data storage 850, 852, 854 and 856. These different storage types indicate that each program can allocate a portion of flash memory 824 for their own data storage requirements. Processor 838, in addition to its operating system functions, may enable execution of software applications on the UE. A predetermined set of applications that control basic operations, including at least data and voice communication applications for example, will normally be installed on UE 800 during manufacturing. Other applications could be installed subsequently or dynamically.

Applications and software may be stored on any computer readable storage medium. The computer readable storage medium may be a tangible or in transitory/non-transitory medium such as optical (e.g., CD, DVD, etc.), magnetic (e.g., tape) or other memory known in the art.

One software application may be a personal information manager (PIM) application having the ability to organize and manage data items relating to the user of the UE such as, but not limited to, e-mail, calendar events, voice mails, appointments, and task items. Naturally, one or more memory stores would be available on the UE to facilitate storage of PIM data items. Such PIM application may have the ability to send and receive data items, via the wireless network 819. Further applications may also be loaded onto the UE 800 through the network 819, an auxiliary I/O subsystem 828, serial port 830, short-range communications subsystem 840 or any other suitable subsystem 842, and installed by a user in the RAM 826 or a non-volatile store (not shown) for execution by the processor 838. Such flexibility in application installation increases the functionality of the device and may provide enhanced on-device functions, communication-related functions, or both. For example, secure communication applications may enable electronic commerce functions and other such financial transactions to be performed using the UE 800.

In a data communication mode, a received signal such as a text message or web page download will be processed by the communication subsystem 811 and input to the processor 838, which may further process the received signal for output to the display 822, or alternatively to an auxiliary I/O device 828.

A user of UE 800 may also compose data items such as email messages for example, using the keyboard 832, which may be a complete alphanumeric keyboard or telephone-type keypad, among others, in conjunction with the display 822 and possibly an auxiliary I/O device 828. Such composed items may then be transmitted over a communication network through the communication subsystem 811.

For voice communications, overall operation of UE 800 is similar, except that received signals would typically be output to a speaker 834 and signals for transmission would be generated by a microphone 836. Alternative voice or audio I/O subsystems, such as a voice message recording subsystem, may also be implemented on UE 800. Although voice or audio signal output is generally accomplished primarily through the speaker 834, display 822 may also be used to provide an indication of the identity of a calling party, the duration of a voice call, or other voice call related information for example.

Serial port 830 in FIG. 8 would normally be implemented in a personal digital assistant (PDA)-type UE for which synchronization with a user's desktop computer (not shown) may be desirable, but is an optional device component. Such a port 830 would enable a user to set preferences through an external device or software application and would extend the capabilities of UE 800 by providing for information or software downloads to UE 800 other than through a wireless communication network. The alternate download path may for example be used to load an encryption key onto the device through a direct and thus reliable and trusted connection to thereby enable secure device communication. As will be appreciated by those skilled in the art, serial port 830 can further be used to connect the UE to a computer to act as a modem.

Other communications subsystems 840, such as a short-range communications subsystem, is a further optional component which may provide for communication between UE 800 and different systems or devices, which need not necessarily be similar devices. For example, the subsystem 840 may include an infrared device and associated circuits and components or a Bluetooth™ communication module to provide for communication with similarly enabled systems and devices. Subsystem 840 may further include non-cellular communications such as WiFi or WiMAX.

Figure 9:
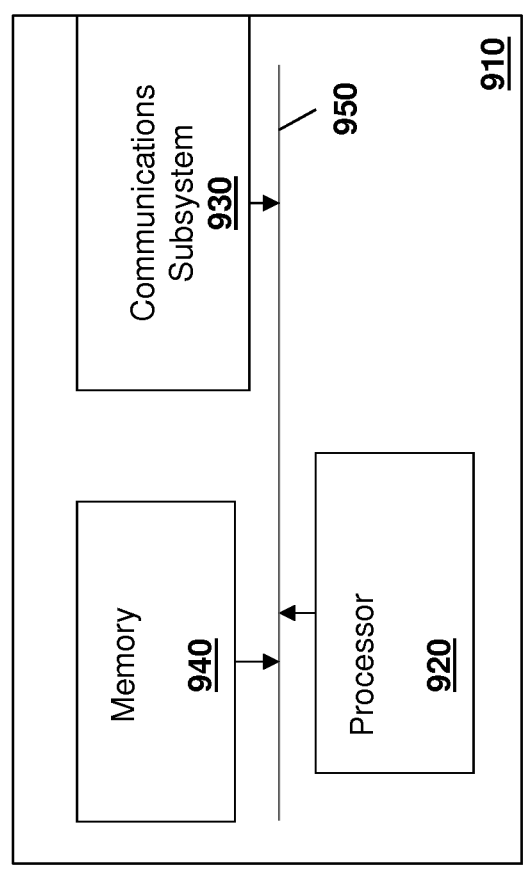
FIG. 9 is a simplified block diagram of a network element.

Further, the eNBs, VLRs, HLRs, RIMS and other network elements referred to and shown herein may be any network element, or part of any network element, including various network servers. Reference is now made to FIG. 9, which shows a generalized example network element.

In FIG. 9, network element 910 includes a processor 920 and a communications subsystem 930, where the processor 920 and communications subsystem 930 cooperate to perform the methods of the embodiments described above.

Processor 920 is configured to execute programmable logic, which may be stored, along with data, on network element 810, and shown in the example of FIG. 9 as memory 940. Memory 940 can be any tangible storage medium.

Alternatively, or in addition to memory 940, network element 910 may access data or programmable logic from an external storage medium, for example through communications subsystem 930.

Communications subsystem 930 allows network element 910 to communicate with other network elements.

Communications between the various elements of network element 810 may be through an internal bus 950 in one embodiment. However, other forms of communication are possible.

The structure, features, accessories, and alternatives of specific embodiments described herein and shown in the Figures are intended to apply generally to all of the teachings of the present disclosure, including to all of the embodiments described and illustrated herein, insofar as they are compatible. In other words, the structure, features, accessories, and alternatives of a specific embodiment are not intended to be limited to only that specific embodiment unless so indicated.

Furthermore, additional features and advantages of the present disclosure will be appreciated by those skilled in the art.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

The invention claimed is:

1. A method at a user equipment, the method comprising:
providing in said user equipment a smartcard having only first subscriber identity information stored thereon, the first subscriber identity information being associated with a home network of the user equipment;
receiving at the user equipment while connected to the home network, in a wireless transmission from a remote server, a plurality of second subscriber identities and corresponding roaming policies;
storing on the provided smartcard by the user equipment the plurality of received second subscriber identities and the corresponding roaming policies while maintaining said first subscriber identity on said smartcard, wherein each of the corresponding roaming policies includes expiry and revocation information necessary to enforce rules of when each of the plurality of the second subscriber identities is used during roaming and when each of the plurality of second subscriber identities needs to be removed from the provided smartcard;
determining that the user equipment is roaming in a visited network;

selecting in response to the determining, based on the roaming policy, one of the plurality of second subscriber identities; and attaching to the visited network based on the selected one of the plurality of second subscriber identities;

wherein the smartcard includes common authentication parameters for the first subscriber identity and the plurality of second subscriber identities.

2. The method of claim 1, wherein the smartcard receives a geographic location of the user equipment from the user equipment.

3. The method of claim 2, wherein the selection of one of the plurality of second subscriber identities is also based on location information.

4. The method of claim 3, wherein the location information is at least one of a mobile country code; a mobile network code; a location area code; a tracking area code; and a cellular identifier.

5. The method of claim 1, wherein the receiving the plurality of second subscriber identities is based on a request from the user equipment.

6. The method of claim 1, wherein the receiving the plurality of second subscriber identities is based on a message pushed to the user equipment.

7. The method of claim 1, wherein location information is received at the smartcard based on a location information request.

8. The method of claim 1, wherein location information is received at the smartcard whenever the user equipment receives an attach accept message.

9. The method of claim 1, wherein the roaming policy includes a prioritized list of location identifiers and associated subscriber identifiers, and wherein the selecting utilizes the location identifiers to select the one of the plurality of second subscriber identities.

10. The method of claim 9, wherein the location identifiers include at least one of a mobile country code; a mobile network code; a location area code; a tracking area code; a cellular identifier; a global positioning system location; and a WiFi service set identifier.

11. The method of claim 1, wherein the selecting further determines whether a currently active network connection needs to be detached.

12. The method of claim 1, wherein the smartcard includes a common file area for data common between the plurality of subscriber identities.

13. The method of claim 12, wherein the common file area is used to store address books for the user equipment.

14. The method of claim 1, wherein the smartcard includes a separate authentication for each subscriber identity.

15. A user equipment comprising:
a processor;
a telecommunications subsystem; and
a smartcard having only first subscriber identity information stored thereon, the first subscriber identity information being associated with a home network of the user equipment, wherein the user equipment is configured to:
receive, while connected to the home network, in a wireless transmission from a remote server a plurality of second subscriber identities and corresponding roaming policies;
store on the provided smartcard the received plurality of second subscriber identities and the corresponding roaming policies while maintaining said first subscriber identity on said smartcard, wherein each of the corresponding roaming policies includes expiry and revocation information necessary to enforce rules of when each of the plurality of the second subscriber identities is used during roaming and when each of the plurality of second subscriber identities needs to be removed from the provided smartcard;
determine that the user equipment is roaming in a visited network;
select in response to the determining, based on the roaming policy, one of the plurality of second subscriber identities; and
attach to the visited network based on the selected second subscriber identity;
wherein the smartcard includes common authentication parameters for the first subscriber identity and the plurality of second subscriber identities.

16. The user equipment of claim 15, wherein the smartcard receives a geographic location of the user equipment from the user equipment.

17. The user equipment of claim 16, wherein the selection of the one of the plurality of second subscriber identities is also based on location information.

18. The user equipment of claim 15, wherein the user equipment is configured to receive the plurality of second subscriber identities based on one of: a request from the user equipment; or a message pushed to the user equipment.

19. The user equipment of claim 15, wherein the smartcard includes a common file area for data common between the plurality of subscriber identities.

* * * * *